United States Patent
O'Hare et al.

(10) Patent No.: US 10,496,278 B1
(45) Date of Patent: Dec. 3, 2019

(54) INLINE COMPRESSION SUPPORT USING DISCRETE SIZED CONTAINERS FOR BACKING STORE

(71) Applicant: EMC Corporation, Hopkinton, MA (US)

(72) Inventors: Jeremy J. O'Hare, Westborough, MA (US); Michael J. Scharland, Franklin, MA (US); Rong Yu, West Roxbury, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 519 days.

(21) Appl. No.: 15/192,352

(22) Filed: Jun. 24, 2016

(51) Int. Cl.
*G06F 12/00* (2006.01)
*G06F 3/06* (2006.01)
*G06F 12/08* (2016.01)

(52) U.S. Cl.
CPC .......... *G06F 3/0604* (2013.01); *G06F 3/0631* (2013.01); *G06F 3/0665* (2013.01); *G06F 3/0683* (2013.01); *G06F 12/08* (2013.01); *G06F 2212/152* (2013.01); *G06F 2212/154* (2013.01); *G06F 2212/163* (2013.01); *G06F 2212/262* (2013.01); *G06F 2212/401* (2013.01); *G06F 2212/657* (2013.01)

(58) Field of Classification Search
None
See application file for complete search history.

(56) References Cited

U.S. PATENT DOCUMENTS

| 8,495,111 B1 * | 7/2013 | Wang | G06F 3/0604 |
| | | | 707/823 |
| 2003/0079081 A1 * | 4/2003 | Okada | G06F 3/0601 |
| | | | 711/113 |
| 2016/0004642 A1 * | 1/2016 | Sugimoto | G06F 3/06 |
| | | | 711/128 |

* cited by examiner

*Primary Examiner* — Ryan Bertram
*Assistant Examiner* — Trang K Ta
(74) *Attorney, Agent, or Firm* — Anderson Gorecki LLP (57) ABSTRACT

A storage array presents a logical production volume that is backed by tangible data storage devices. The production volume is organized into fixed size front end allocation units. The tangible data storage devices are organized into discrete size back end allocation units of a plurality of different sizes. Data associated with each one of the front end allocation units is stored on only one of the back end allocation units. For example, compressed data may be stored on a back end allocation unit that is smaller than a front end allocation unit while maintaining a 1-to-1 relationship between the front end allocation unit and the back end allocation unit.

18 Claims, 5 Drawing Sheets

INLINE COMPRESSION SUPPORT USING DISCRETE SIZED CONTAINERS FOR BACKING STORE

BACKGROUND

The subject matter of this disclosure is generally related to data storage systems that may be used to maintain large data sets and support multiple host applications and concurrent users. A data storage system may include multiple storage arrays. Each storage array may include multiple computing nodes that manage access to tangible data storage devices. Each storage array presents one or more logical production volumes of storage to host applications running on a host device. The host applications may access the production volumes by sending IOs to the storage arrays. The computing nodes maintain an abstraction layer between the production volumes and the tangible data storage devices.

SUMMARY

All examples, aspects and features mentioned in this document can be combined in any technically possible way.

In accordance with an aspect an apparatus comprises: a storage array comprising: a plurality of tangible data storage devices; and a computing node comprising a processor and a cache, wherein the computing node presents a production volume to a host application, the production volume being backed by the tangible data storage devices and organized into fixed size front end allocation units, wherein the tangible data storage devices are organized into discrete size back end allocation units of a plurality of different sizes, and data associated with each one of the front end allocation units is stored on only one of the back end allocation units. In some implementations the back end allocation units exist in sizes that are no greater than the fixed size of the front end allocation units. In some implementations uncompressed data is stored on back end allocation units having a size equal to the fixed size of the front end allocation units. In some implementations compressed data is stored on back end allocation units having a size less than the fixed size of the front end allocation units. In some implementations the apparatus comprises a data pool comprising a plurality of logical storage devices, each logical storage device of the data pool comprising back end allocation units of identical size. In some implementations each logical storage device is associated with at least one respective slice of a drive group of the tangible data storage devices, wherein the tangible data storage devices of the drive group are organized as a RAID group. In some implementations the computing node selects a back end allocation unit based on compressibility of data relative to available back end allocation unit sizes. In some implementations the computing node selects a back end allocation unit based on whether the back end allocation unit is associated with a tangible data storage device that is managed by the computing node. In some implementations the computing node selects a back end allocation unit based on whether the back end allocation unit is associated with a tangible data storage device that has more unallocated back end allocation units that other tangible data storage devices. In some implementations the computing node selects a back end allocation unit based on location of the back end allocation unit on a tangible data storage device.

In accordance with an aspect a method comprises: with a storage array comprising a plurality of tangible data storage devices and a computing node comprising a processor and a cache: presenting a production volume to a host application, the production volume being backed by the tangible data storage devices and organized into fixed size front end allocation units; organizing the tangible data storage devices into discrete size back end allocation units of a plurality of different sizes; and storing data associated with each one of the front end allocation units on only one of the back end allocation units. In some implementations the method comprises instantiating the back end allocation units in sizes that are no greater than the fixed size of the front end allocation units. In some implementations the method comprises storing uncompressed data on back end allocation units having a size equal to the fixed size of the front end allocation units. In some implementations the method comprises storing compressed data on back end allocation units having a size less than the fixed size of the front end allocation units. In some implementations the method comprises forming a data pool comprising a plurality of logical storage devices, each logical storage device of the data pool comprising back end allocation units of identical size. In some implementations the method comprises associating each logical storage device with at least one respective slice of a drive group of the tangible data storage devices, wherein the tangible data storage devices of the drive group are organized as a RAID group. In some implementations the method comprises selecting a back end allocation unit based on compressibility of data relative to available back end allocation unit sizes. In some implementations the method comprises selecting a back end allocation unit based on whether the back end allocation unit is associated with a tangible data storage device that is managed by the computing node. In some implementations the method comprises selecting a back end allocation unit based on whether the back end allocation unit is associated with a tangible data storage device that has more unallocated back end allocation units that other tangible data storage devices. In some implementations the method comprises selecting a back end allocation unit based on location of the back end allocation unit on a tangible data storage device.

DETAILED DESCRIPTION

Some aspects, features and implementations described herein may include computer devices, components and computer-implemented steps or processes. It should be apparent to those of ordinary skill in the art that the computer-implemented steps or processes may be stored as computer-executable instructions on a non-transitory computer-readable medium. Furthermore, it should be understood by those of ordinary skill in the art that the computer-executable instructions may be executed on a variety of tangible processor devices. For ease of exposition, not every step, process or element is described herein as part of a computer system. Those of ordinary skill in the art will recognize steps, processes and elements that may have a corresponding computer system or software component. Such computer system and software components are therefore enabled by describing their corresponding steps, processes or elements, and are within the scope of the disclosure.

The terminology used in this description is intended to be interpreted broadly within the limits of subject matter eligibility. The terms "logical" and "virtual" are used to refer to features that are abstractions of other features or tangible devices. For example, multiple virtual computing devices could operate simultaneously on one tangible computing device. The term "physical" is used to refer to tangible features, components and devices. A "host application" is a computer program that accesses a storage service provided by a storage array. A "production volume" is a logical unit of storage that is presented to the host application. Tangible data storage devices are used to implement the storage service and present the production volume.

Figure 1:
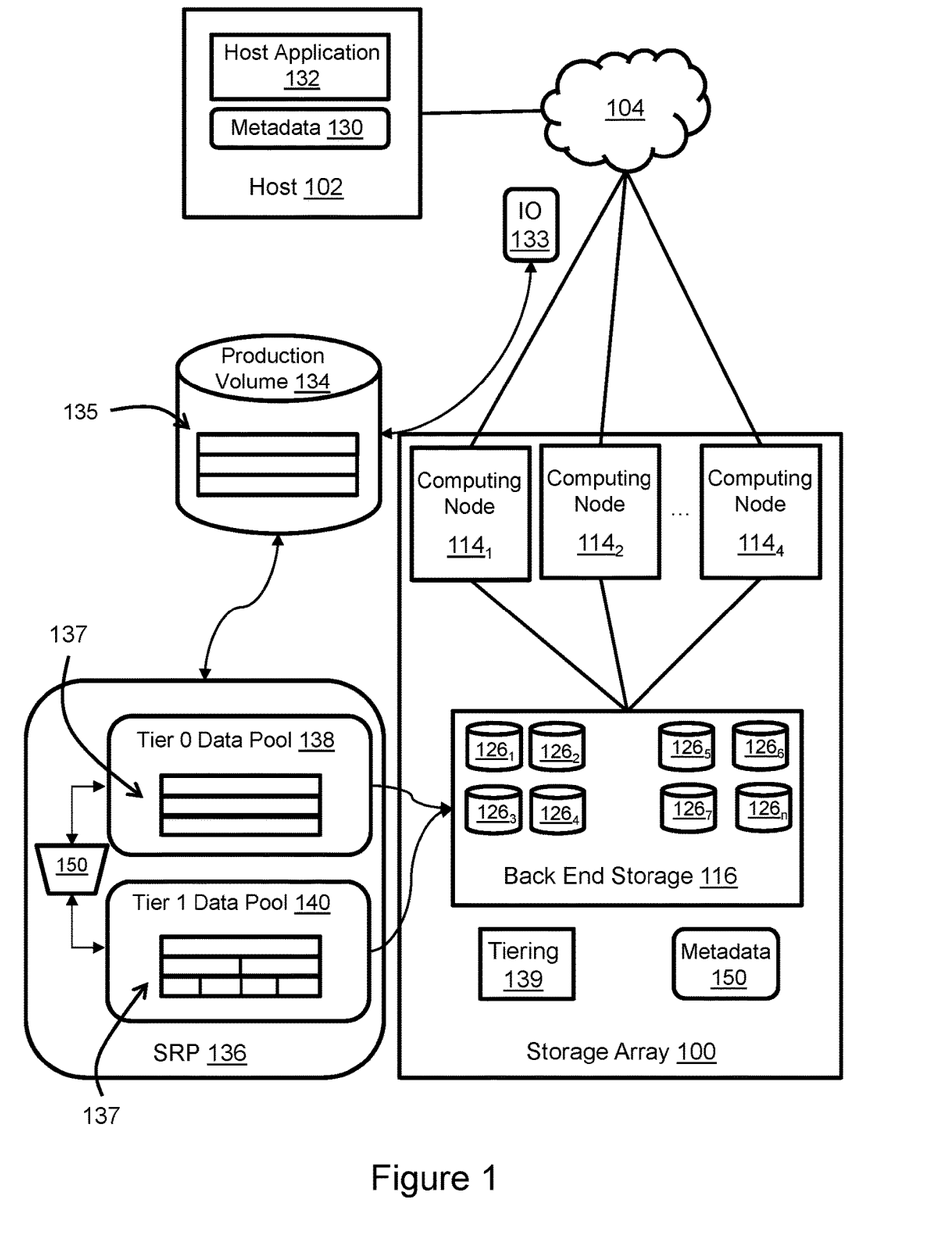
FIG. 1 illustrates a storage array with data pools configured with discrete size containers for compressed data.

FIG. 1 illustrates an exemplary data storage system with a single data storage array 100 and a single external host device 102. Any number of host devices and data storage arrays could be included in the data storage system. Further, internal hosts may be instantiated within the storage array. The host device 102 is connected to the storage array 100 via a network 104. The network 104 may include various types of network nodes, e.g. switches, routers, hubs, and other network devices, and may include one or more of the Internet, a WAN (wide area network), MAN (metropolitan area network), LAN (local area network), and SAN (Storage Area Network).

The host 102 may be a tangible server computer with memory, storage and processors, or a virtual host associated with a virtual machine or container running on a tangible server computer. The host 102 operates a host application 132 that utilizes storage services provided by the storage array 100. There may be any number of host applications running on the host. Examples of host applications include but are not limited to a database, file server and block server.

The storage array 100 includes one or more interconnected computing nodes $114_1$-$114_4$ and back end storage 116. The computing nodes and back end storage may be, but are not necessarily, located in the same geographic location. Back end storage 116 includes tangible data storage devices $126_1$-$126_n$. The computing nodes $114_1$-$114_4$ may include "vanilla" storage server computers and specialized computer hardware platforms including but not limited to storage directors that are specifically designed for use in storage arrays. The computing nodes maintain at least one logical production volume 134 that is backed by the tangible data storage devices $126_1$-$126_n$. Without limitation, the production volume may be referred to as a production LUN or host LUN, where LUN (logical unit number) is a number used to identify the logical storage volume in accordance with the SCSI (small computer system interface) protocol. The production volume 134 represents an abstraction layer between the back end storage 116 and the host 102. From the perspective of the host 102, data resides on production volume 134, which is a single data storage device having a set of contiguous fixed-size LBAs (logical block addresses). However, the data may actually be maintained by the computing nodes at non-contiguous addresses on various different tangible storage devices of the back end storage. The storage array maintains metadata 150 indicative of the locations of extents of data on the tangible storage devices. Consequently, the computing nodes can use the metadata 150 to determine the actual location of data on the tangible data storage devices $126_1$-$126_n$ based on a reference to the production volume 134 in an IO 133.

The tangible data storage devices $126_1$-$126_n$ that back the production volume 134 may be organized as a SRP (storage resource pool) 136. The SRP 136 may include multiple data pools 138, 140. Each data pool may be associated with a particular technology type of the tangible data storage devices, and different data pools may be associated with different technology types of storage devices. In the illustrated example the tangible data storage devices $126_1$-$126_n$ include SSDs (solid state drives) and HDDs (hard disk drives) associated with a tier 0 and a tier 1 respectively. Although SSDs and HDDs may be considered as two exemplary technology types it should be understood that there are potentially multiple SSD technology types and multiple HDD technology types. For example, SSDs having different performance capabilities in terms of response time may be considered as different technology types. Data pool 138 is associated with some or all of the tier 0 SSDs. Data pool 140 is associated with some or all of the tier 1 HDDs. The data pools may be used for storage tiering in order to satisfy a SLO (service level objective) that indicates, for the production volume 134 (or a storage group of multiple production volumes), demands for quality of service measured by response time to IO access to that production volume. For example, the SLO for production volume 134 may indicate an TO response time of no greater than 5 ms in order to enable the host application 132 to provide a target level of performance or user experience. The performance tier composition of the SRP 136 may be selected to help satisfy the SLO. Further, a storage tiering program 139 may be implemented by the computing nodes to promote relatively active data (e.g. recently accessed) to higher performance storage media, e.g. to tier 0 data pool 138, and demote relatively inactive data (e.g. not recently accessed) to lower performance storage media, e.g. to tier 1 data pool 140. Promotion and demotion of extents of data between data devices and tiers may occur periodically or continuously as activity levels change.

The production volume 134 has a total storage capacity that is organized into fixed size front end allocation units 135 of storage capacity for management purposes. The fixed size front end allocation units may be based on existing conventions. On a spinning disk HDD a track may correspond to a concentric band on the disk and a sector may be a portion of such a concentric band. A sector may be the smallest unit of storage that a tangible HDD storage device processes, e.g. providing a sector in response to a read or overwriting a sector in response to a write. 1 sector may be 512 bytes. 1 block may be 8 sectors. 1 track may be 32 sectors (128 KB). 1 cylinder may be 15 tracks. The host 102 maintains metadata 130 indicating which locations on the production volume 134 are available and which data is stored at particular locations. The host application 132 requests IOs (input and output operations) with reference to the production volume 134 by specifying locations using one or more of the front end allocation units of storage and addresses indicated by the metadata 130, e.g., specifying a front end track number, sector and address. For purposes of explanation and without limitation the front end allocation units 135 of storage capacity into which the production volume is organized will be referred to as front end tracks of 128 KB in size.

The computing nodes $114_1$-$114_4$ may use back end allocation units 137 of storage capacity as a basic unit for processing IOs. The back end allocation units of storage capacity used by the computing nodes as a basic unit for processing IOs may be referred to as "containers" or "back end tracks." The size of the back end allocation units used by the computing nodes of a storage array is generally proportional to the manageability of the metadata, but inversely proportional to resource utilization efficiency when retrieving data from persistent storage. For purposes of explanation and without limitation, the computing nodes may read and write uncompressed data from and to the storage bay in back end tracks 137 that are the same size as the front end tracks 135, e.g. and without limitation 128 KB in size. The 1-to-1 relationship between the fixed size units of storage capacity of the production volume (front end tracks) and the allocation units of the storage array (back end tracks) generally facilitates operation of the storage array. For example, splitting of a front end track among multiple back end tracks can be avoided. However, there may be benefits associated with storing at least some data in compressed form (as compressed data), and the benefit of compressing a 128 KB front end track of production volume data may be at least partly negated if a 128 KB back end track is allocated to store that compressed data. In other words, the space "saved" by compression is still allocated so no space saving benefit is realized. In order to maintain the 1-to-1 relationship between the fixed size units of storage of the production volume (front end tracks) and the allocation units of the storage array (back end tracks) when data compression is utilized, the storage array may implement the allocation units (back end tracks) 137 in multiple, variable, discrete sizes. Discrete size back end tracks may be instantiated as needed and include sizes that are multiples of a basic unit size or factors of the largest size allocation unit, e.g. factors of 128 KB or multiples of 8 KB from 8 KB to 128 KB. In the illustrated example data pool 138 includes only 128 KB back end tracks, and data pool 140 includes 128 KB back end tracks, 56 KB back end tracks and 28 KB back end tracks. As will be explained in greater detail below, a back end track may be selected for storing compressed data based at least in part on the size of the compressed data relative to the size of the back end track, thereby realizing space savings from compression while maintaining a 1-to-1 relationship between the front end tracks and the back end tracks. The illustrated back end track sizes are merely for context, and although many different sizes of back end tracks may be available, not every possible size of back end track is necessarily instantiated at any point in time.

Figure 2:
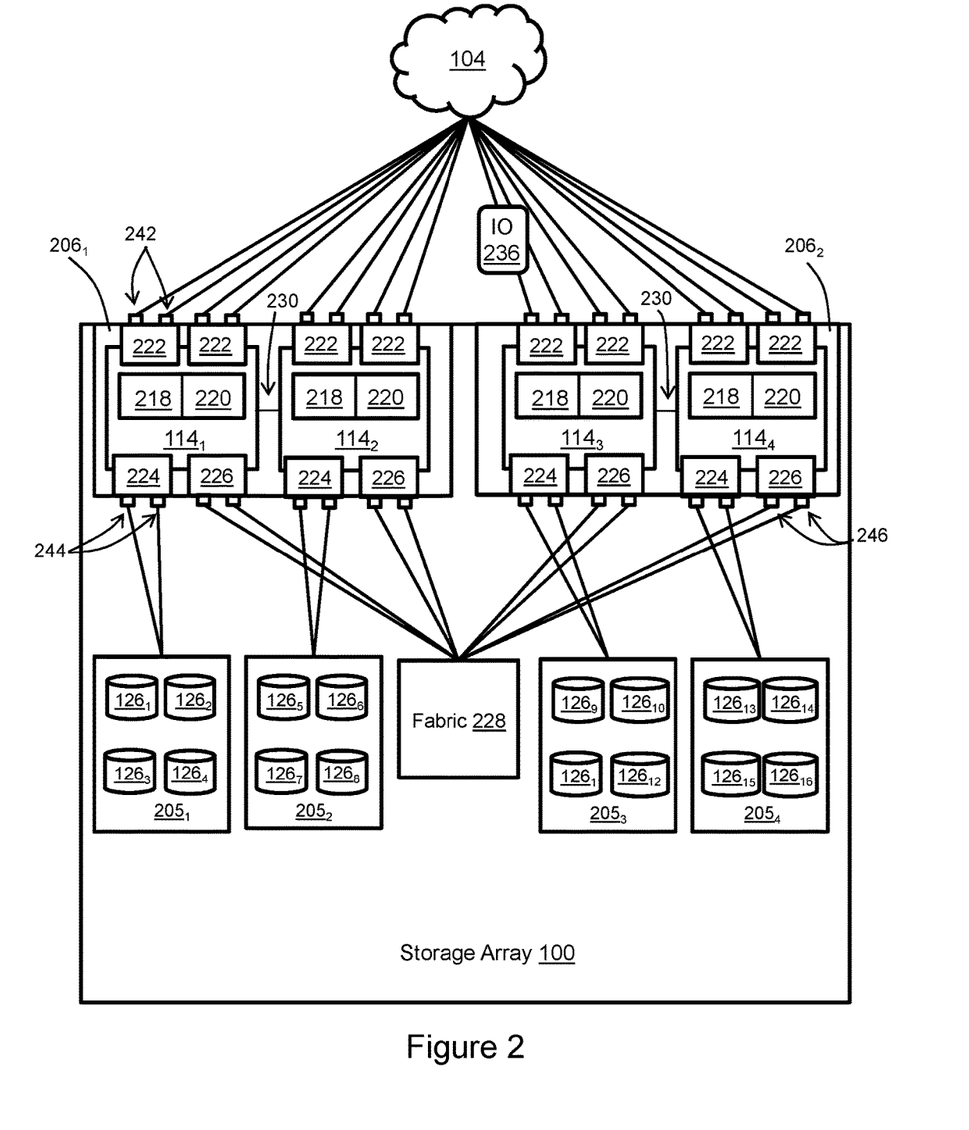
FIG. 2 illustrates the storage array in greater detail.

FIG. 2 illustrates exemplary data storage array 100 in greater detail in order to facilitate understanding of usage of discrete size back end tracks. The back end storage 116 (FIG. 1) includes sets of managed drives $205_1$-$205_4$. Each managed drive set is a subset of the tangible storage devices $126_1$-$126_n$ and is directly connected with only one of the computing nodes. Pairs of computing nodes $200_1$, $200_2$ and $200_3$, $200_4$ may be organized as storage engines $206_1$, $206_2$, respectively. The paired computing nodes of a storage engine may be directly interconnected by communication links 230. The paired computing nodes of a storage engine provide failover protection for each other. Each computing node includes at least one tangible multi-core processor 218 and a cache 220. The cache 220 may include, for example and without limitation, volatile memory components such as RAM (random access memory) and non-volatile memory components such as high performance SSDs. Each computing node may allocate a partition of its respective cache 220 to a shared "global" cache that can be accessed by other computing nodes via the communication links 230, 232, e.g. via DMA (direct memory access) or RDMA (remote direct memory access). Each computing node may include one or more FEs (front-end directors, aka front end adapters) 222 for communicating with the host 102 (FIG. 1), cloud storage, other storage arrays and other devices that can be reached via the network 104. Each computing node may also include one or more BEs (back end directors, aka back end adapters) 224 for communicating with its associated managed drives. Each computing node may also include one or more CAs (channel directors, aka channel adapters) 226 for communicating with other computing nodes via interconnecting fabric 228. Each FE 222 includes two ports 242. Each BE 224 includes two ports 244. Each CA 226 includes two ports 246. In order for a computing node to service an IO request, the corresponding host application data is temporarily placed in cache 220 while being copied between the host application 110 and the tangible storage devices. More particularly, data that is being written to back end storage is temporarily held in cache 220 and then destaged to back end storage, and data that is being read is temporarily copied from back end storage to cache and then provided to the host application. IOs are not necessarily serviced by the computing node that manages the tangible storage devices on which the data is stored.

Figure 3:
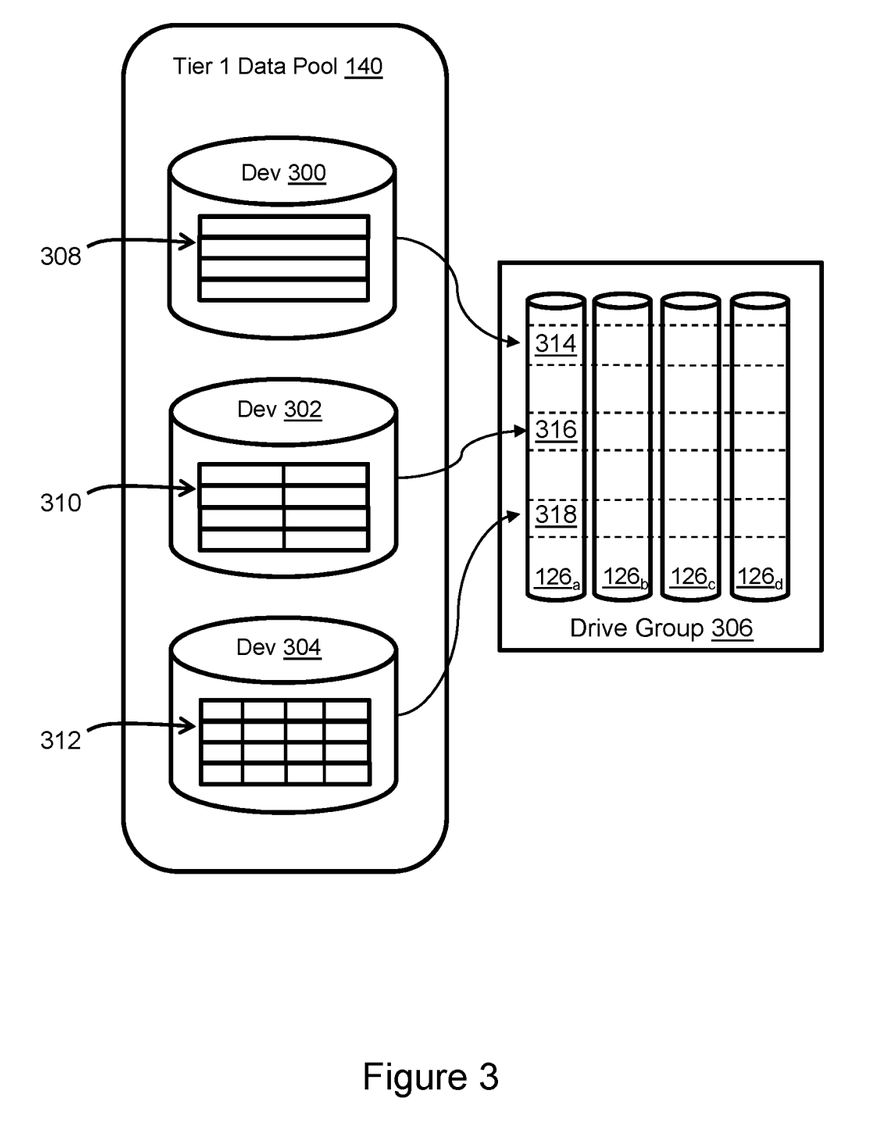
FIG. 3 illustrates an implementation of the data pool with discrete size containers.

FIG. 3 illustrates an implementation of the tier 1 data pool 140 with multiple, variable, discrete size back end tracks. The data pool 140 includes three logical devices 300, 302, 304. Each logical device is organized into back end tracks of a single size, and different devices have different size back end tracks. For example, device 300 may include 128 KB back end tracks 308, device 302 may include 56 KB back end tracks 310, and device 304 may include 28 KB back end tracks 312. The devices 300, 302, 304 are backed by a drive group 306. The drive group 306 includes multiple tangible storage devices $126_a$ through $126_d$, i.e., multiple ones of the tangible storage devices $126_1$ through $126_n$ (FIG. 1), that share the same performance characteristics, e.g. technology type, rotational speed, and capacity. The storage devices of the drive group 306 are also part of the same RAID group, e.g. a RAID-5 (3+1) in the illustrated example although other RAID levels could be used. Each logical device in the data pool 140 is backed by one or more slices of the drive group, e.g. as defined by an address range. For example, device 300 may be backed by a 128 KB slice 314, device 302 may be backed by a 56 KB slice 316 and device 304 may be backed by a 28 KB slice 318.

Referring to FIGS. 1 and 3, more active data may be stored uncompressed in the tier 0 data pool 138 and managed in back end tracks having the same size as the front end tracks of the production volume, e.g. 128 KB. Less active data may be compressed by compression algorithm 150 and stored in the tier 1 data pool 140. When a front end track 135 is stored in the tier 1 data pool 140, a back end track is selected based on various factors including compressibility of the front end track. For example, if the size of the compressed data is 48 KB then a 56 KB back end track 310 may be used to store the compressed data. If the data becomes sufficiently more active then it may be moved to the tier 0 data pool 138 and stored uncompressed in a 128 KB back end track. If the data becomes less active and the size of the compressed data has increased to 68 KB then a 128 KB back end track 308 in the tier 1 data pool may be used to store the compressed data. The front end track is not split between multiple back end tracks.

Figure 4:
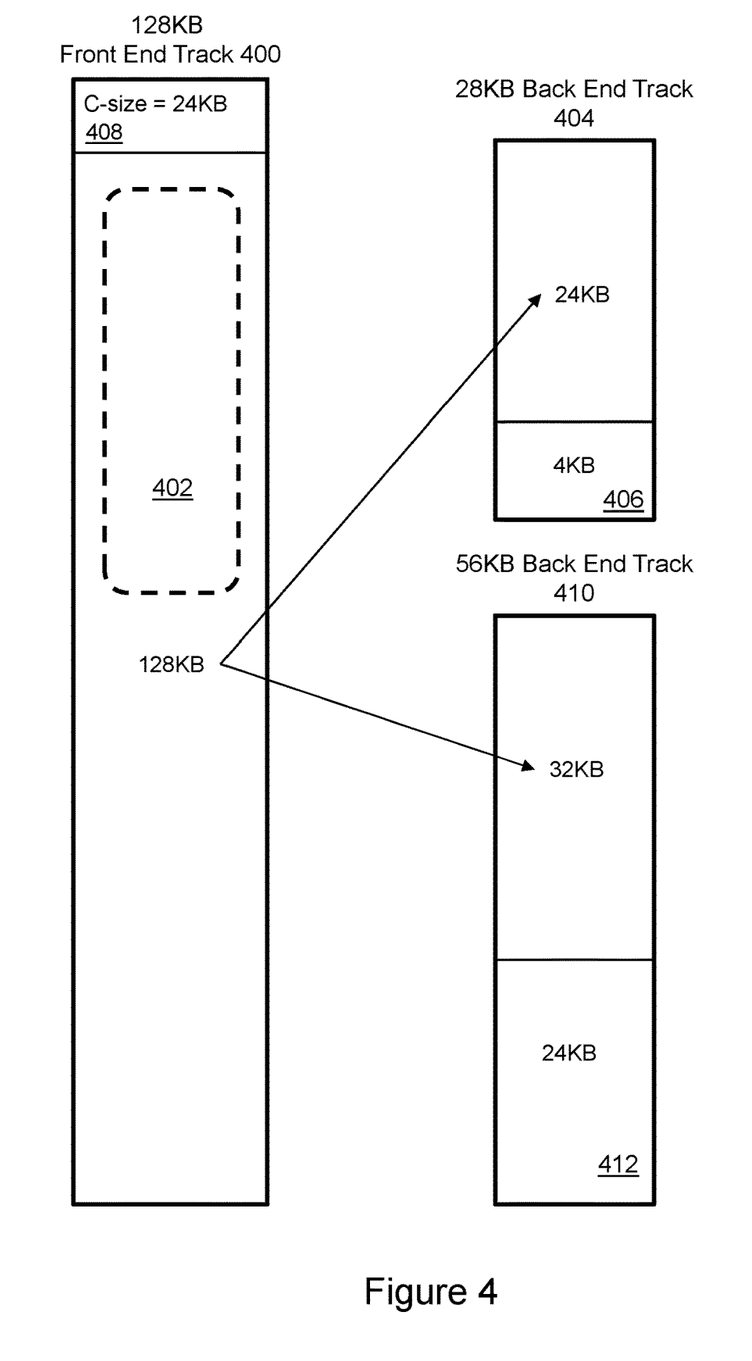
FIG. 4 illustrates use of different discrete size containers.

FIG. 4 illustrates processing of an exemplary 128 KB front end track 400. The front end track 400 has a 128 KB capacity and data 402 that is less than or equal to the capacity of the front end track when the data is uncompressed. At some point in time the data 402 in the front end track is compressible to 24 KB. On the basis of that compressibility and the relative activity level of the data a 28

KB back end track 404 is selected to store the compressed data. A 4 KB pad 406 of available space remains in the 28 KB back end track 404. A hint field 408 associated with the front end track 400 indicates the compressibility of the data 402, e.g., with a value that represents the compressed data size or compressibility. At some subsequent point in time the compressibility of the data 402 may change. For example, a write IO may change the size or composition of the data such that the data is only compressible to 28 KB. Because the available pad 406 is large enough to accommodate the change in compressibility the compressed data may continue to be maintained in the 28 KB back end track 404. However, if the size of the compressed data changes to a value greater than 28 KB then the data would be moved to a larger back end track. For example, if the data 402 became compressible to only 32 KB then the compressed data would be rewritten to a 56 KB back end track 410, leaving a pad 412 of 24 KB. A write may also increase the compressibility of data, and data may be rewritten to a smaller size back end track.

Figure 5:
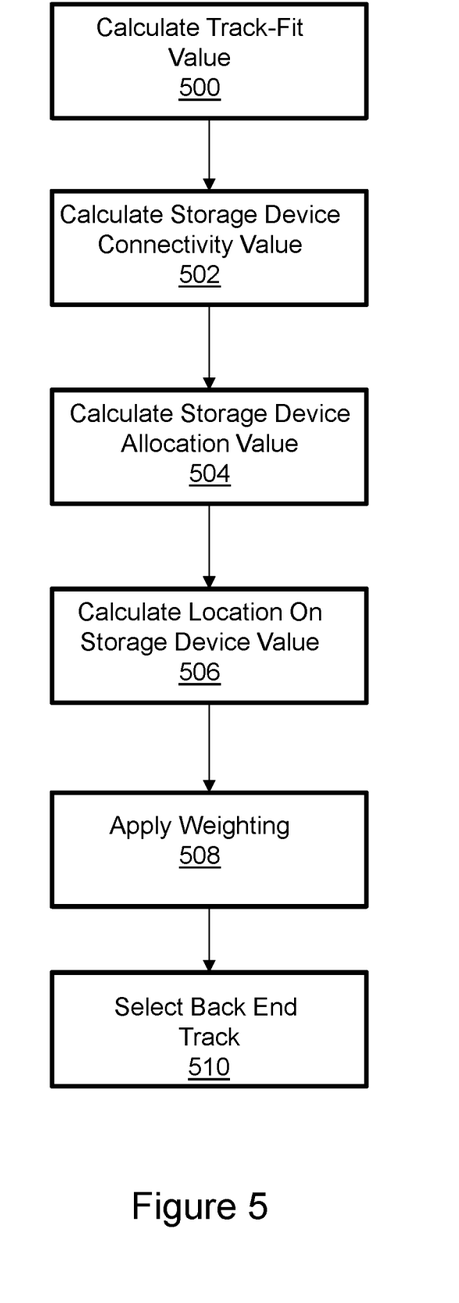
FIG. 5 illustrates container selection.

FIG. 5 illustrates aspects of back end track selection. One aspect is to calculate a track-fit value as indicated in block 500. The track fit value is an indication of how closely the size of the compressed data matches the size of the back end tracks. The track fit value may favor selection of a back end track that is large enough to accommodate the compressed data with the least amount of unutilized space. In context, a 12 KB compressed data extent would be a poor match for a 128 KB back end track as opposed to a 24 KB track because although both back end tracks are large enough to accommodate the compressed data, use of the 128 KB track would result in less space savings. An exact size match is not necessarily considered as the best match however. For example, although a 28 KB compressed data extent could be efficiently accommodated by a 28 KB back end track there exists a possibility that the compressed data extent could increase in size, thereby necessitating relocation. Whether to include a pad of some size in the track-fit calculation is an implementation decision. In general, however, back end tracks of insufficient size to accommodate the compressed data extent are removed from consideration by the track-fit value calculation. A storage device connectivity value is calculated in block 502. In general, the computing node that is performing track selection may calculate a value that favors selection of a set of drives that are managed by the computing node, or to a lesser magnitude, favors selection of a set of drives that are managed by a paired computing node of the same engine. A storage device allocation value is calculated in block 504. This may include calculation of a value that favors selection of storage devices with fewer allocations, possibly resulting in balancing of IOs across storage devices. A value for location on the storage device is calculated in step 506. It is known that different locations on some types of storage devices may exhibit somewhat different performance, and it may also be advantageous to group data based on relative activity level. Weightings may be applied to the calculated values as shown in block 508. A back end track is then selected based on the calculated weighted values as indicated in block 510.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
  a storage array comprising:
    a plurality of tangible data storage devices; and
    a computing node comprising a processor and a cache, wherein the computing node presents a production volume to a host application, the production volume being backed by the tangible data storage devices and organized into fixed size front end allocation units, wherein the tangible data storage devices are organized into discrete size back end allocation units of a plurality of different sizes, and data associated with each one of the front end allocation units is stored on only one of the back end allocation units;
    wherein back end allocation units of identical size are grouped together on corresponding logical storage devices of a data pool comprising at least one logical storage device for each size.

2. The apparatus of claim 1 comprising the back end allocation units existing in sizes that are no greater than the fixed size of the front end allocation units.

3. The apparatus of claim 2 comprising uncompressed data stored on back end allocation units having a size equal to the fixed size of the front end allocation units.

4. The apparatus of claim 3 comprising compressed data stored on back end allocation units having a size less than the fixed size of the front end allocation units.

5. The apparatus of claim 1 comprising each logical storage device being associated with at least one respective slice of a drive group of the tangible data storage devices, wherein the tangible data storage devices of the drive group are organized as a RAID group.

6. The apparatus of claim 1 comprising the computing node selecting a back end allocation unit based on compressibility of data relative to available back end allocation unit sizes.

7. The apparatus of claim 6 comprising the computing node selecting a back end allocation unit based on whether the back end allocation unit is associated with a tangible data storage device that is managed by the computing node.

8. The apparatus of claim 7 comprising the computing node selecting a back end allocation unit based on whether the back end allocation unit is associated with a tangible data storage device that has more unallocated back end allocation units than other tangible data storage devices.

9. The apparatus of claim 8 comprising the computing node selecting a back end allocation unit based on location of the back end allocation unit on a tangible data storage device.

10. A method comprising:
  with a storage array comprising a plurality of tangible data storage devices and a computing node comprising a processor and a cache:
  presenting a production volume to a host application, the production volume being backed by the tangible data storage devices and organized into fixed size front end allocation units;
  organizing the tangible data storage devices into discrete size back end allocation units of a plurality of different sizes;
  forming a data pool comprising a plurality of logical storage devices, each logical storage device of the data pool comprising back end allocation units of identical size; and
  storing data associated with each one of the front end allocation units on only one of the back end allocation units of the data pool.

11. The method of claim 10 comprising instantiating the back end allocation units in sizes that are no greater than the fixed size of the front end allocation units.

12. The method of claim 11 comprising storing uncompressed data on back end allocation units having a size equal to the fixed size of the front end allocation units.

13. The method of claim 12 comprising storing compressed data on back end allocation units having a size less than the fixed size of the front end allocation units.

14. The method of claim 10 comprising associating each logical storage device with at least one respective slice of a drive group of the tangible data storage devices, wherein the tangible data storage devices of the drive group are organized as a RAID group.

15. The method of claim 10 comprising selecting a back end allocation unit based on compressibility of data relative to available back end allocation unit sizes.

16. The method of claim 15 comprising selecting a back end allocation unit based on whether the back end allocation unit is associated with a tangible data storage device that is managed by the computing node.

17. The method of claim 16 comprising selecting a back end allocation unit based on whether the back end allocation unit is associated with a tangible data storage device that has more unallocated back end allocation units than other tangible data storage devices.

18. The method of claim 17 comprising selecting a back end allocation unit based on location of the back end allocation unit on a tangible data storage device.

* * * * *